United States Patent [19]
Blackman et al.

[11] Patent Number: 5,271,497
[45] Date of Patent: Dec. 21, 1993

[54] STORAGE ASSEMBLAGE FOR INDEX PRINT SHEETS AND CASSETTES

[75] Inventors: Robert J. Blackman, Rochester; David E. Hansen, Fairport, both of N.Y.

[73] Assignee: Eastman Kodak Company, Rochester, N.Y.

[21] Appl. No.: 3,171

[22] Filed: Jan. 12, 1993

[51] Int. Cl.$^5$ .......................................... B65D 85/671
[52] U.S. Cl. ..................... 206/232; 206/389; 206/425; 206/455; 206/472
[58] Field of Search ............. 40/124, 124.1, 124.2, 40/124.4, 152, 152.1, 154, 156, 157, 158.1, 159, 159.2; 206/0.8, 0.81–0.84, 45.34, 216, 223, 225, 232, 333, 387, 389, 391, 409, 425, 444, 449, 450, 454–456, 457, 459.5, 461–483, 559–565, 581; 242/71, 71.1, 71.7; 281/21, 22, 26, 28, 31, 51; 434/429

[56] References Cited

U.S. PATENT DOCUMENTS

| | | | |
|---|---|---|---|
| 2,178,067 | 10/1939 | Cohen | 206/482 |
| 4,319,684 | 3/1982 | Backman et al. | 206/470 |
| 4,629,067 | 12/1986 | Pavlik et al. | 206/564 |
| 4,844,260 | 7/1989 | Jaw | 206/472 |
| 5,060,814 | 10/1991 | Oglesbee | 206/470 |
| 5,161,907 | 11/1992 | Byrne | 206/387 |

FOREIGN PATENT DOCUMENTS 0590288 4/1959 Italy .................. 206/562

*Primary Examiner*—Jimmy G. Foster
*Attorney, Agent, or Firm*—Roger A. Fields

[57] ABSTRACT

A storage assemblage is disclosed for cassettes each of which holds an image bearing medium having recorded images and for index print sheets each of which has printed pictures that match the images on the image bearing medium in one of the cassettes. According to the invention, there is provided one or more containers each of which includes a flat transparent cover and a flat back dimensioned to snugly hold an index print sheet between them with the pictures on the index print sheet visible through the cover. The back has a fulcrum projecting from one of edge of the back, and a nest open at an inner side of the back to receive a cassette and which projects from an outer side of the back to hold the cassette out of the way of the index print sheet. A box has a support for the back of each container, a groove arranged to receive the nest of each container when the back of the container is laid against the support, and slot-like means adapted to receive the fulcrum of each container to support the container for pivoting about its fulcrum to lower its back onto the support and its nest into the groove.

6 Claims, 4 Drawing Sheets

STORAGE ASSEMBLAGE FOR INDEX PRINT SHEETS AND CASSETTES

CROSS-REFERENCE TO RELATED APPLICATION(S)

Referenced is made to commonly assigned pending application Ser. No. 08/003,364, entitled CONTAINER FOR INDEX PRINT SHEET AND CASSETTE, and filed Jan. 12, 1991 in the name of R. J. Blackman.

BACKGROUND OF THE INVENTION

1. Field of the Invention

The invention relates to a storage assemblage for cassettes each of which holds an image bearing medium having recorded images and for index print sheets each of which has printed pictures that match the images on the image bearing medium.

2. Description of the Prior Art

Generally, a processing laboratory gives the customer a processed photographic negative film and photographs which are enlarged and printed from the film. The negative film is usually cut into several sections, each one containing the same number of negatives and inserted in an open-ended sheath or sleeve. Many customers store the photographs in an envelope (with the negatives), making it difficult to later find a particular photograph.

Index or contact print sheets have been proposed which make it easier to find a particular negative. An index print sheet has printed on it several rows of pictures that match the negatives. The pictures are numbered in accordance with numbering of the negatives.

A book-like container for the index print sheet, the negatives, and individual prints is disclosed in U.S. Pat. No. 4,966,285, issued Oct. 30, 1990. The container is rather bulky and has no provision for storing a film cassette. Alternatively, the patent discloses a book-like container for an index print sheet and a still video floppy disc cassette. The index print sheet is stored in an exterior pocket formed by a transparent sheet secured along three of its edges to the respective outsides of a cover and a base of the container. Moving the cover away from the base to open the container flexes the index print sheet along a mid-line. This flexing can possibly damage the index print sheet. The cassette is stored in an interior pocket raised from the base. This arrangement makes the container rather bulky.

The Cross-Referenced Application

The cross-referenced application discloses a container for a cassette holding an image bearing medium having a plurality of images recorded on it and for an index print sheet on which are printed a plurality of pictures that match the plurality of images on the image bearing medium. The container comprises a transparent sheet-like cover having a length and width slightly larger than corresponding dimensions of the index print sheet to closely overlay the index print sheet, and a sheet-like back having a length and width similar to the length and width of the cover to store the index print snugly between the cover and the back with the plurality of pictures on the index print sheet visible only through the cover. The back includes an integrally formed nest blown outward to hold the cassette out of the way of the index print sheet.

SUMMARY OF THE INVENTION

A storage assemblage is provided for cassettes each of which holds an image bearing medium having recorded images and for index print sheets each of which has printed pictures that match the images on the image bearing medium in one of the cassettes. According to the invention, there is provided one or more containers each of which includes a flat transparent cover and a flat back dimensioned to snugly hold an index print sheet between them with the pictures on the index print sheet visible through the cover. The back has a fulcrum projecting from one edge of the back, and a nest open at an inner side of the back to receive a cassette and which projects from an outer side of the back to hold the cassette out of the way of the index print sheet. A box has a support for the back of each container, a groove arranged to receive the nest of each container when the back of the container is laid against the support, and slot-like means adapted to receive the fulcrum of each container to support the container for pivoting about its fulcrum to lower its back onto the support and its nest into the groove.

DETAILED DESCRIPTION OF THE PREFERRED EMBODIMENT

Figure 1:
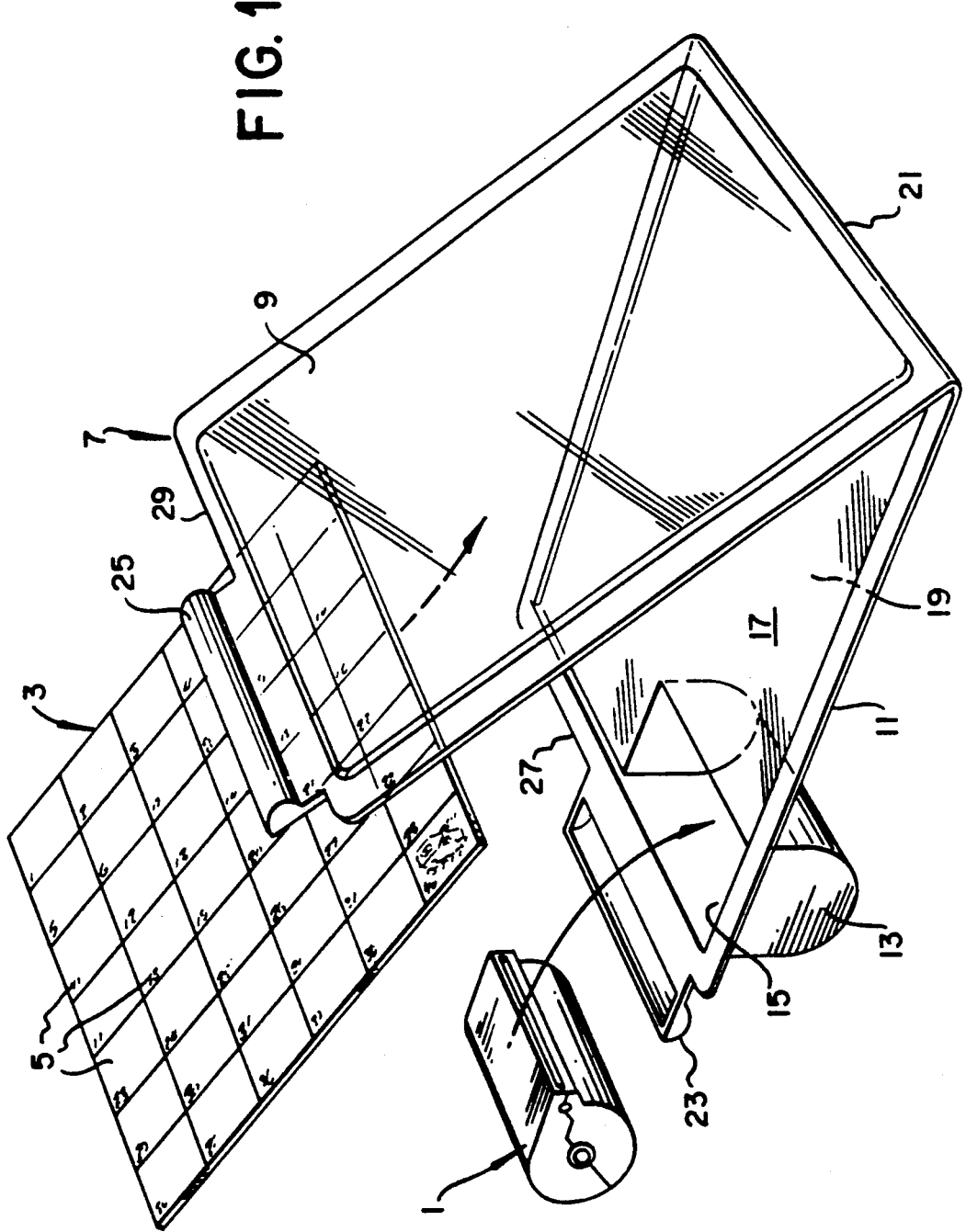
FIG. 1 is a perspective view of a container according to a preferred embodiment of the invention, showing how the container is opened to receive a cassette and an index print sheet.
Figure 2:
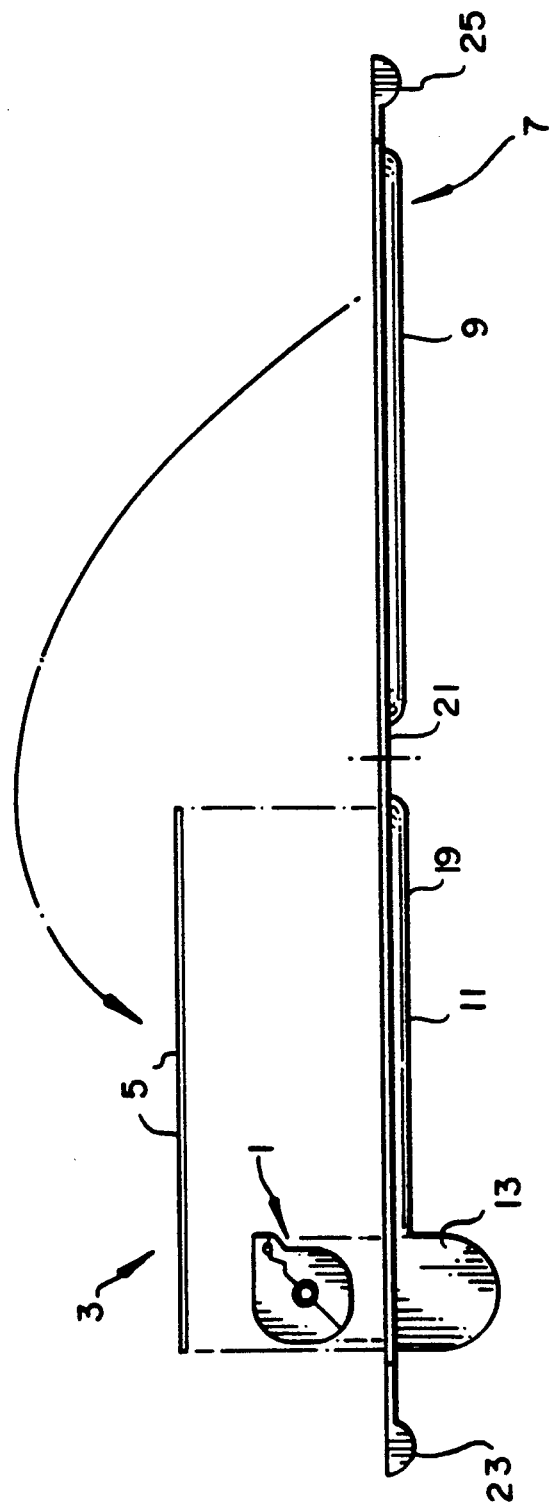
FIG. 2 is an end view of the container with the cassette and the index print sheet.

Referring to FIGS. 1 and 2, a 35 mm film cassette 1 is shown similar to the one disclosed in commonly assigned copending application Ser. No. 07/793,980 entitled FILM CASSETTE HAVING SPOOL CORE WITH FASTENING HOOK and filed Nov. 18, 1991 in the names of D. R. Zander and C. M. Csaszar. The cassette 1 holds a rolled filmstrip, not shown, having a series of successively numbered negatives.

An index print sheet 3 similar to the one disclosed in U.S. Pat. No. 4,966,285, issued Oct. 30, 1990, has a series of pictures 5 printed on it that match the negatives on the filmstrip inside the cassette 1. The pictures 5 are numbered in accordance with numbering of the negatives.

A container 7 for the cassette 1 and the index print sheet 3 consists of a single piece of transparent molded thin plastic. A sheet-like cover or lid 9 of the container 7 has a length and a width slightly larger than corresponding dimensions of the index print sheet 3 to closely overlay the index print sheet. See FIGS. 1 and 2. A sheet-like back or base of the container 7 has a length and a width similar to the length and the width of the cover 9 to store the index print sheet 3 snugly between the cover and the back with the series of pictures 5 on the index print sheet visible only through the cover. The back 11 includes an integrally formed nest or receptacle 13 having an access opening 15 at an inner side 17 of the back to receive the cassette 1 and projecting from an outer side 19 of the base to hold the cassette 1 out of the way of the index print sheet 3. A "living" hinge 21 connects the cover 9 and the back 11 to swing the cover away from the back to open and close the container 7. Known means, not shown, releasably secure the cover 9 and the back 11 to prevent the container 7 from being accidentally opened. A pair of mating fulcrum halves 23 and 25 project from respective edges 27 and 29 of the back 11 and the cover 9.

Figure 3:
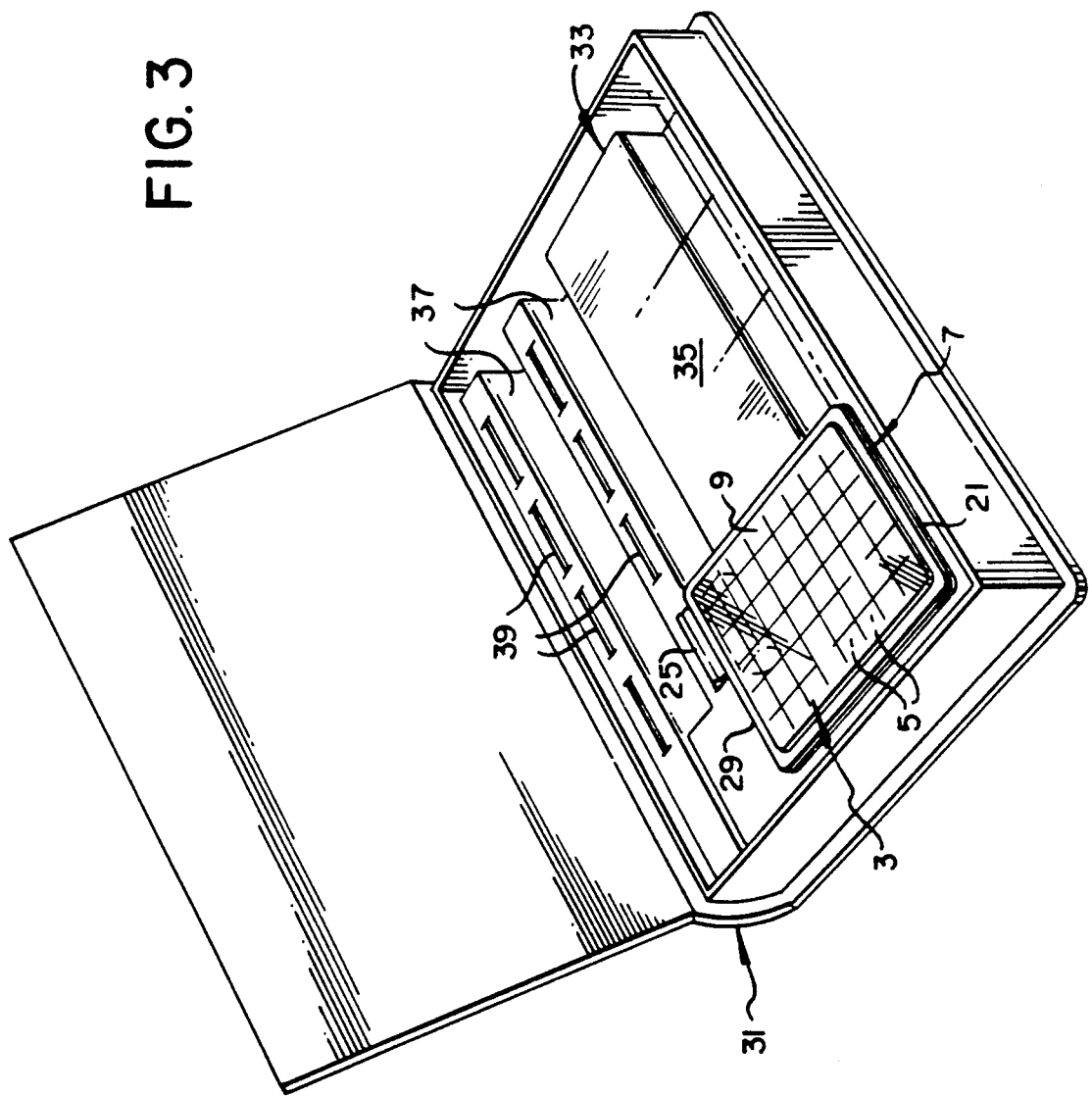
FIG. 3 is a perspective view of a storage box for the container, according to a preferred embodiment of the invention.
Figure 4:
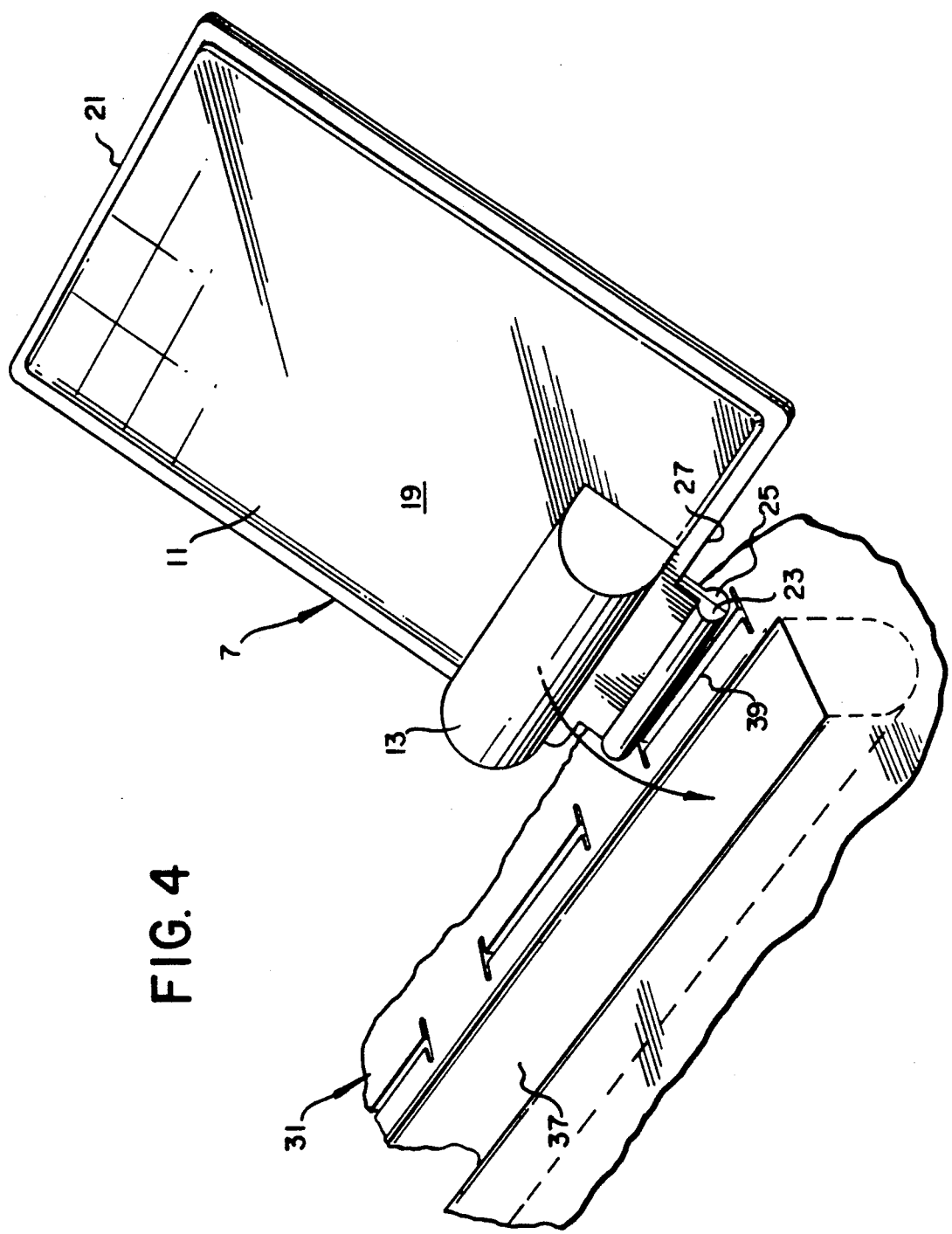
FIG. 4 is a perspective view of a part of the storage box, showing how the container is placed in it.

A book-like storage box 31, shown in FIGS. 3 and 4, includes an interior storage deck or platform 33. The platform 33 has a support face 35 for the back 11 of each container 7, a pair of grooves 37 each one of which is arranged to receive the nest 13 of a container, and a plurality of slot-like means 39 each one of which is adapted to receive the fulcrum half 23 of a container to support the container for pivoting about that fulcrum half to lower the back 11 of the container onto the support face 35 and the nest 13 of the container into one of the grooves 37. See FIG. 4. The respective slot-like means 39 are resiliently deformable to receive the fulcrum half 23.

As suggested in FIG. 3, the relative positioning of the support face 35, the pair of grooves 37, and the plurality of slot-like means 39 allows the storage box 31 to store more than one container 7 in a staggered or layered manner.

The invention has been described with reference to a preferred embodiment. However, it will be appreciated that variations and modifications can be effected within the ordinary skill in the art without departing from the scope of the invention.

We claim:

1. A storage assemblage for cassettes each of which holds an image bearing medium having recorded images and for index print sheets each of which has printed pictures that match the images on the image bearing medium in one of the cassettes, said storage assemblage comprising:
   containers each of which includes a flat transparent cover and a flat back dimensioned to snugly hold an index print sheet between them with the pictures on the index print sheet visible through said cover, said back having a fulcrum projecting from one edge of the back and a nest open at an inner side of the back to receive a cassette and projecting from an outer side of the back to hold the cassette out of the way of the index print sheet; and
   a box including a support for said back of each container, a groove arranged to receive said nest of each container when the back of the container is laid against said support, and slot-like means adapted to receive said fulcrum of each container to support the container for pivoting about its fulcrum to lower its back onto the support and its nest into said groove.

2. A storage assemblage as recited in claim 1, wherein each container further includes a hinge connecting its cover and its back along one edge of the back disposed substantially parallel to said edge of the back from which said fulcrum projects.

3. A storage assemblage as recited in claim 2, wherein said nest is located intermediate said fulcrum and said hinge.

4. A storage assemblage as recited in claim 1, wherein said slot-like means is resiliently deformable to receive said fulcrum.

5. A container for a cassette holding an image bearing medium having recorded images and for an index print sheet having printed pictures that match the images on the image bearing medium, said container comprising:
   a flat transparent cover and a flat back dimensioned to snugly hold an index print sheet between them with the pictures on the index print sheet visible through said cover;
   said back having a nest open at an inner side of the back to receive a cassette and projecting from an outer side of the back to hold the cassette out of the way of the index print sheet, and a fulcrum projecting sufficiently distanced from one edge of the back to permit said container to be pivoted about said fulcrum without being obstructed by said nest.

6. A storage box for containers each of which has a flat transparent cover and a flat back dimensioned to snugly hold an index print sheet between them with printed pictures on the index print sheet visible through the cover, a fulcrum projecting from one edge of the back, and a nest open at an inner side of the back to receive a negative return cassette and projecting from an outer side of the back to hold the cassette out of the way of the index print sheet, said storage box comprising:
   a support for the back of each container;
   a groove arranged to receive the nest of each container when the back of the container is laid against said support; and
   slot-like means adapted to receive the fulcrum of each container to support the container for pivoting about its fulcrum to lower its back onto said support and its nest into said groove.

* * * * *